(No Model.)　　　　　　　J. A. BRILL.　　　4 Sheets—Sheet 3.
MOTOR TRUCK FOR CARS.
No. 445,308.　　　　　　　　Patented Jan. 27, 1891.
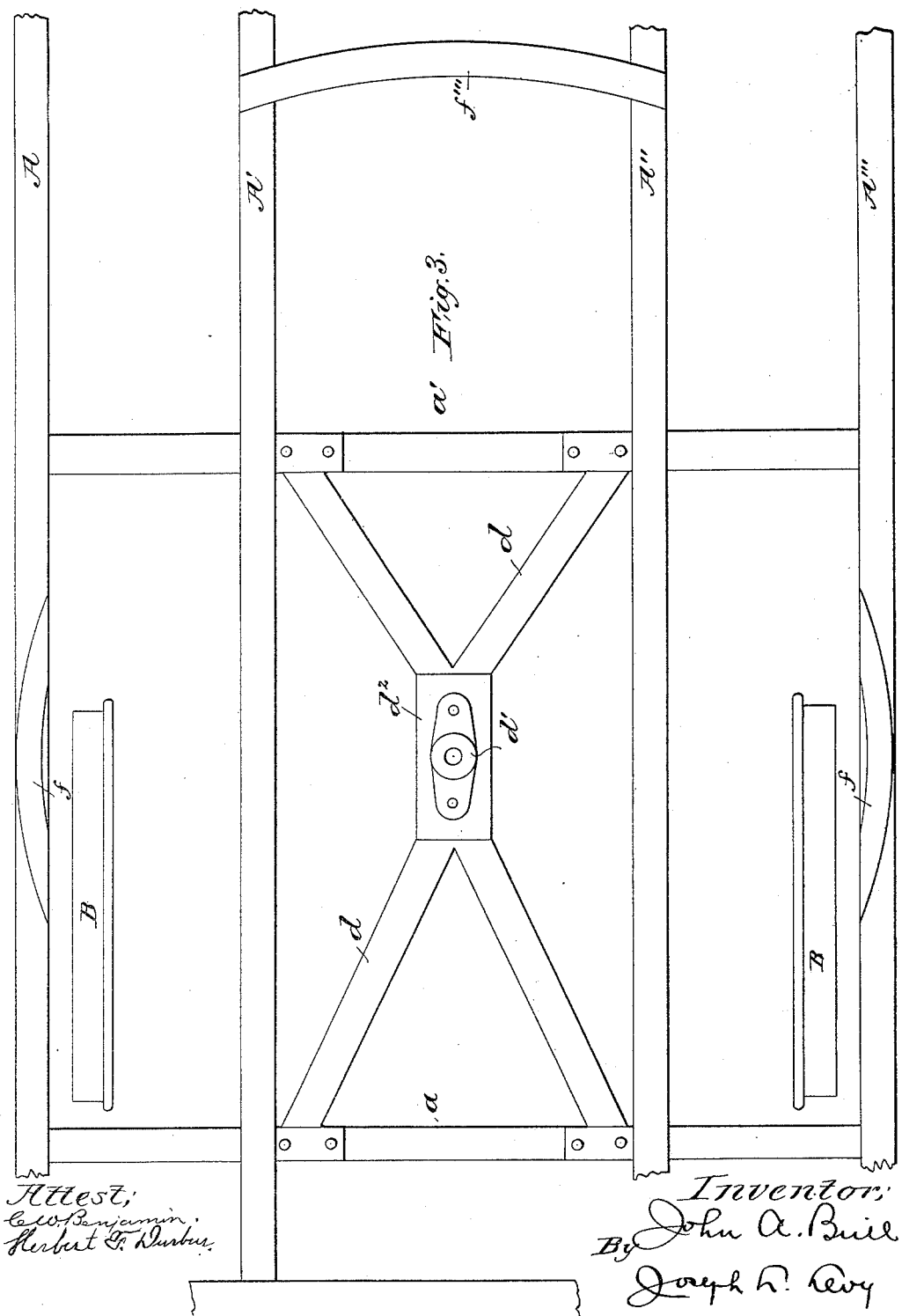

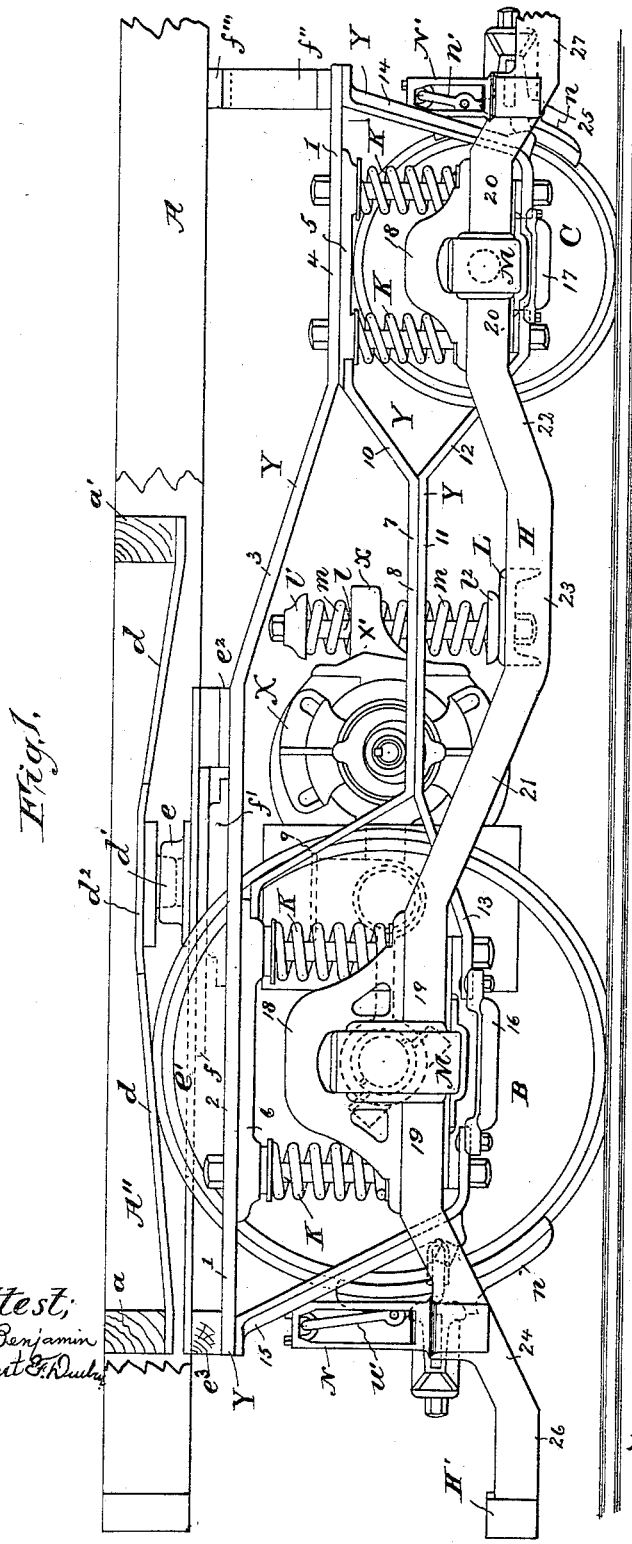

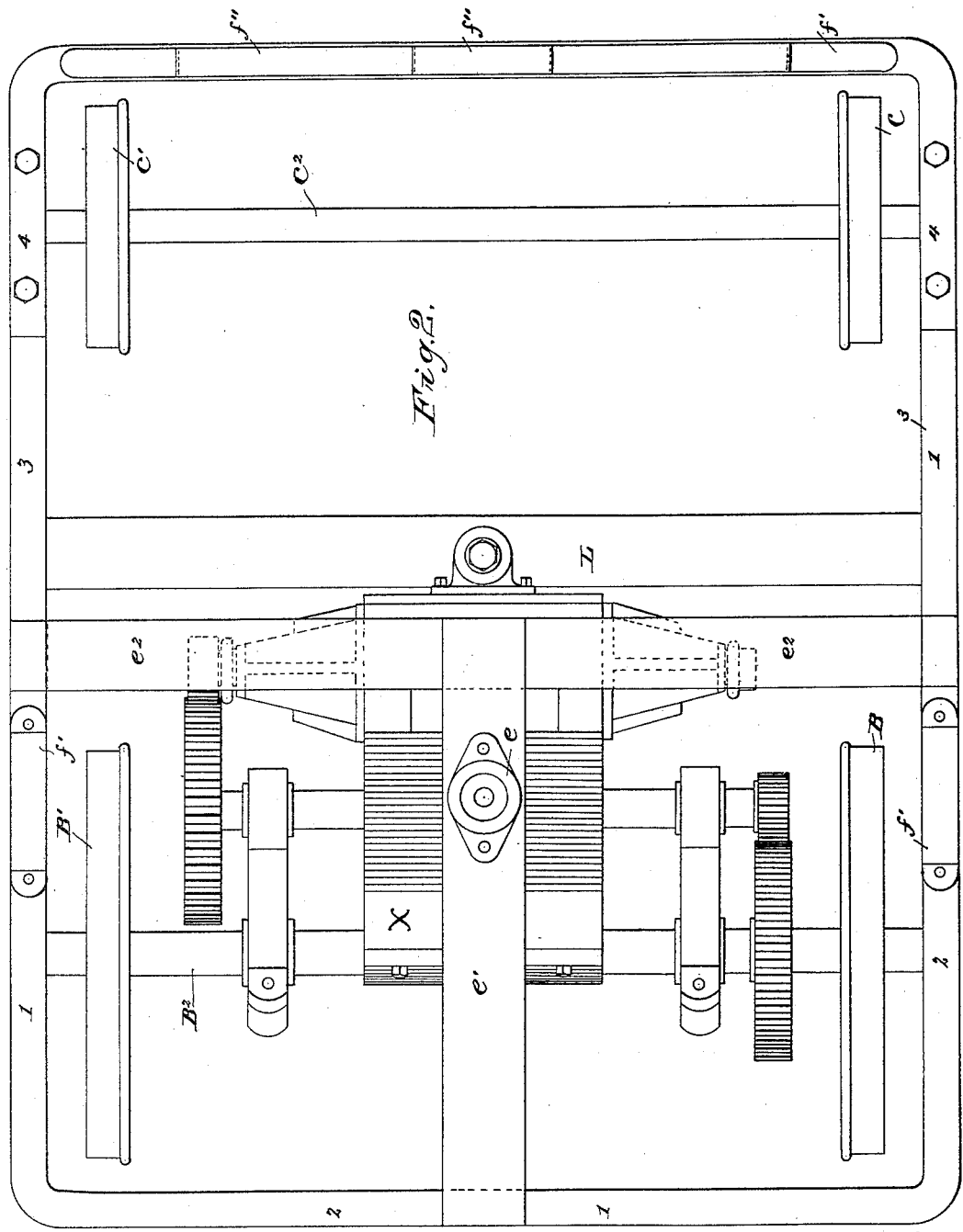

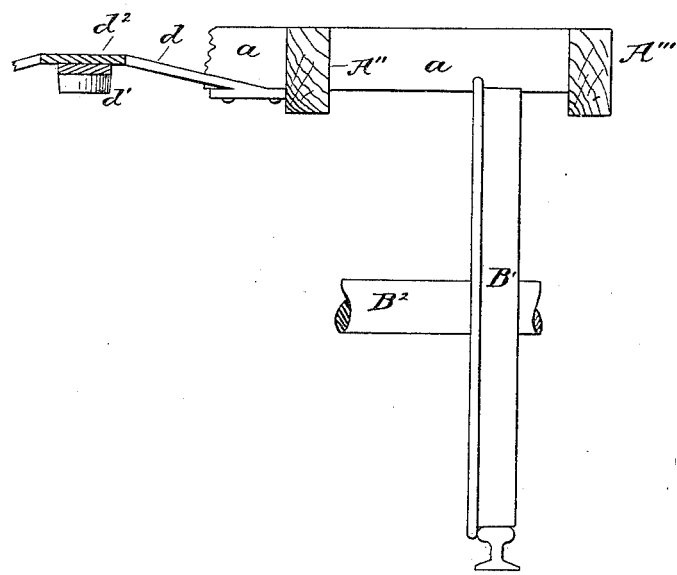

UNITED STATES PATENT OFFICE.

JOHN A. BRILL, OF PHILADELPHIA, PENNSYLVANIA.

MOTOR-TRUCK FOR CARS.

SPECIFICATION forming part of Letters Patent No. 445,308, dated January 27, 1891.

Application filed October 3, 1890. Serial No. 366,954. (No model.)

*To all whom it may concern:*

Be it known that I, JOHN A. BRILL, a citizen of the United States, residing at Philadelphia, in the county of Philadelphia and State of Pennsylvania, have invented new and useful Improvements in Pivotal Car-Trucks, of which the following is a specification.

My invention relates to improvements in four-wheel pivotal car-trucks intended for use under eight-wheel cars, which trucks are to carry either a motor or cable-grip for the propulsion of the same. The present practice in eight-wheel electric cars is to put one motor in each truck, and in many cases but one motor to a car has been used. Where this is the case—that is, where but one motor is used—the matter of traction is an important consideration. In order to get this increased traction and to realize other important improvements, I have constructed my truck as hereinafter shown and described.

My invention consists in so arranging and constructing the parts that the car-body can be brought lower down toward the truck-axles than is usual in cars provided with trucks having large wheels of the class herein described.

It further consists in constructing two of the wheels of each of the trucks much larger than the other two wheels, the larger wheels being intended for driving-wheels, and the truck and the car-body directly over the truck being so constructed in reference to each other that these large or driving wheels may be advantageously used. It is by making these driving-wheels larger than usual that I am enabled to accomplish important improvements in the matter of traction. By reason of this enlargement of two of the wheels of the truck I can obtain greater and freer space for the motor or grip and at the same time provide a means whereby the power of the motor can be more economically applied to the driving-axles, for I can use a much larger gear-wheel on the driving-axle and a much smaller gear-wheel on the motor than has hitherto been done.

Another very important feature of my invention is to reduce the amount of radiation which occurs when the car is on a curve. By radiation I refer to the angular relation of the wheels and longitudinal timbers of the car-body to each other. So far as this part of my invention is concerned the arrangement for reducing the radiation may be applied to pivotal trucks of ordinary construction; but its main features of utility are realized when used upon the truck shown and described herein. I accomplish this by locating what I term the "pivotal center"—that is, the center of radiation of the car-body and truck in relation to each other—nearer to the driving-axle than to the axle of the small or following wheels of the truck, and I have found that such pivotal center may be located at any point between the actual center of the truck and the center of the driving-wheel axle; but I much prefer to locate such pivotal center as nearly over the driving-axle as possible, in order that the greatest reduction of radiation of large or driving wheels may be obtained with safety.

In other cases where large wheels have been used on trucks, in order that the benefits may be derived from such increase in size and that the weight of the car-body may be taken on the center of the bolster of the truck, it (the bolster) has to be made proportionately very large, with a correspondingly heavy structure to support it, and the body-bolster has to be made proportionately large and strong, in order that, among other things, free space may be had under the car-body for radiation.

In my present invention the particular form or arrangement of the transverse and longitudinal beams of the car enables the body-bolster to be set up into the car, and further enables the truck-bolster to be raised up above the truck-frame by reason of taking the weight of the car on the upper chord of the truck. By this arrangement the body-bolster and truck-bolster can be made very much lighter and occupy perpendicularly very little space, so that the large wheels can project up into the car-body and have free space for radiation, the location of the pivotal center, as shown and described, assisting, so far as the decreasing of the radiation is concerned, in the accomplishment of the beneficial results of this particular structural combination.

A further improvement consists in taking the weight of the car upon the driving-wheel axle instead of upon the center plate, the center plate being used to determine the center of oscillation, and to which the draft of the car is applied. The rigid truck-frame is so arranged that it takes the weight of the car-body and transfers it to the driving-axle. The upper chord of the rigid frame is provided with rub-plates, and the car-body is also provided with rub-plates, both corresponding and both of which are so located that the weight of the car is transferred to the rigid truck-frame within or substantially within lines drawn between the center of the truck and the center of the driving-wheel axle. On the trailing end of the rigid truck-frame is located a rub-plate which corresponds with a rub-plate placed on the car-body, and this may be either located, as shown, at the end of the frame or directly over the axle of the small or trailing wheel, and is intended to be a bearing to keep that part of the truck from mounting, and carries but little weight.

The tendency is to build trucks for electrically-propelled cars which shall be so constructed as to carry but one motor. Where this has been tried, the trucks almost invariably tip up at the end opposite that upon which the motor is mounted, and the axles therefore spring. A rub-plate placed preferably on the central longitudinal axis of the truck and on that end opposite to which the motor is placed would prevent this, and is a new and valuable feature. Wherever but one motor is used on a truck without regard as to the location of the pivotal center, this addition will form a very material and desirable feature, and by reason of the unbalanced condition of the truck-frame, due to the greater part of the weight of the motor being located at one end of the truck, the wheels at the other end have a marked tendency to climb or get off the track.

Another very important feature of my invention consists in reducing what is termed the "wheel-base" of a truck—that is, the longitudinal distance between the centers of the front and rear truck-wheels. This I am enabled to accomplish by the location of the truck-bolster, as shown and described herein.

In cases where the weight of the car-body is taken on the truck-bolster it has to be made very large and strong and very often as much as twelve inches in thickness, and, besides, the extra thickness of the bolster itself, its guides, and contiguous parts of the truck also have to be increased in size. In cases like this, where it is desired to carry a motor or grip on the truck the wheel-base must necessarily be proportionately large, making the reduction of the same a thing much to be desired. This I accomplish by locating the bolster entirely without the body of the truck, so that the wheel-base can be shortened by just so much space as would otherwise have been occupied by the bolster were it placed within the truck-frame. The truck is also provided with side beams, which, with a channel-beam transversely disposed, forms a loose independent frame which is not subject to the motion of the car-body nor to the lateral thrust of the axle, and this I term the "loose axle-box frame." To the ends of the side beams are affixed the life-guards. This loose axle-box frame wholly or substantially carries wheel-brake shoes and mechanism for operating them.

As my invention is principally intended for use on electric cars where one or both trucks are provided with motors, I attach one end of the motor to the axle-box frame, the other end being preferably pivotally supported from the driving-wheel axle. The axle-box frame is also constructed with a view of adapting it for the large and small wheel-trucks shown herein.

My invention also comprises the particular form of rigid truck-frame whereby it is adapted for the purposes of this invention; and it further consists in the combination of parts hereinafter shown, described, and claimed.

In the accompanying drawings, Figure 1 is a side elevation of one of my trucks applied to the car-body, a part of the longitudinal beams of the car being broken away to show the pivotal center of the truck. Fig. 2 is a plan view of the rigid frame of the truck, showing the method of building up or supporting the truck center-plate and showing the position of the motor, the other parts of the truck being omitted for the sake of clearness. Fig. 3 is a plan view of the bottom of the car-body, showing the body-bolster and rub-plates and position of wheels within the longitudinal beams of the car-body. Fig. 4 is a diagrammatic view illustrating the relation of the large driving-wheel to the longitudinal side beams and body-bolster.

The same letters of reference refer to like parts throughout the several views.

I will first describe the arrangement in the truck of the large wheels with reference to their connection with the body of the car and the truck itself. Longitudinal car-sills are shown at A, A', A², and A³. These are longitudinal timbers, that form the base of the car-body.

At $a\ a'$ are shown the transverse timbers of the car-platform.

At B B' are shown the large wheels of the truck which are used as driving-wheels, B² being the axle of the same.

At C C' are shown the small truck or trailing wheels, and C² the axle of the same.

It will be seen that the car-frame is so arranged that the driving-wheels B and B' can project up into the car-body between the longitudinal sills, and that room is provided by special arrangement of the same, so that the wheels can radiate therein when the car-body is moving on a curve. In this way I can lower my car-body considerably and still permit the wheels to have the necessary amount of motion in relation to the car-body.

As has already been stated, among other things, in order to provide for radiation in the trucks having wheels of increased diameter an enlargement of the truck and body-bolster has been necessitated. By my arrangement I am enabled to lower the car-body so that the wheels project up into it and at the same time materially decrease the size and weight of the truck and body bolster, locating the male and female center plates within the longitudinal sills of the car-body.

The car body and truck are pivotally connected by means of the center plates in the following manner: At $e$ is shown the female center plate secured to the longitudinal truss $e'$, which truss is secured to the rigid frame Y of the truck by means of the transverse arch-bar $e^2$ and block $e^3$. The transverse arch-bar $e^2$ and block $e^3$ also serve to elevate the truss $e'$ and with it the center plate $e$ up into the car-body, the arch-bar $e^2$ being formed with a gradual rise to the point where the truss $e'$ is secured to it, the block $e^3$ being made of sufficient height to keep the truss $e'$ level.

At $d$ is shown an X-shaped brace, which is secured to the transverse timbers $a\,a'$ of the car-body. This brace $d$ has an upward rise from its point of suspension and terminates with a flat plate $d^2$. To the under side of this flat plate $d^2$ is securely attached the male center bearing $d'$, which fits into the cavity in the female center plate $e$.

The foregoing forms the pivotal connection between the car body and the truck and is what I have heretofore termed the "pivotal center;" but I do not limit myself to this method of pivotally uniting the truck and car-body, for many other mechanisms may be used for doing the same thing; but it must be understood in this connection that I do not refer to the idea of elevating such pivotal center up into the car-body.

It is not intended to carry any of the weight of the car-body on the center plates, but to make the large driving-wheels take it. This is accomplished by placing rub-plates $f\,f$ on the longitudinals or sills and rub-plates $f'\,f'$ on the upper chord 1 of the rigid truck-frame, and the center about which these rub-plates radiate I locate within lines drawn between the center of the truck and the center of the driving-axle, but preferably as nearly over the driving-axle as can be done consistent with safety. The rub-plates $f\,f$ on the under side of the car-sills and the rub-plates $f'\,f'$ on the upper chord of the rigid truck-frame are of course intended to operate in contact with each other, and between these plates the pivotal center is located.

At the rear end of the upper chord 1 of the rigid truck-frame is another rub-plate $f^2$, and the car-sills are provided with a corresponding rub-plate $f^3$. The rub-plate $f^2$ has an upward inclination where it meets the rub-plate $f^3$. These rub-plates are used to keep the trailing end of the truck from mounting and carries but little, if any, weight. If desired, these rub-plates may be located directly or very nearly over the axle $C^2$.

As before stated, where but one motor has been used upon a truck great difficulty has been found in its use, because of that end of the truck opposite the motor rising or tipping up, and the consequent springing of the axle and the tendency to climb or run off the track.

In my device the location of the rear rub-plates $f^2\,f^3$, as shown, does away with this disadvantageous feature. Of course it will be obvious that the end rub-plates may be used for this purpose, irrespective of where the pivotal center is placed.

Another very important advantage obtained by placing the pivotal center close to the axle of the driving-wheels is to obtain a smaller amount of radiation or angular movement between the large wheels and the car-timbers than would be had if the pivotal point was at the center of the truck. Thus the longitudinal sills of the cars can come quite close to the large driving-wheels and still permit the truck to pass around curves of comparatively small radius.

I am aware that it is not new to place the pivotal center away from the actual center of the truck; but I think it is new in the combinations which are herein pointed out in connection with this particular organization.

The rigid truck-frame Y is here constructed with a view of carrying the large driving-wheels at one end and the small truck or trailing wheels at the other, the forward portion of the frame being elevated so as to carry the rub-plates and truss and arch-bar for supporting the female center plate, while the rear or trailing portion is depressed for the purpose of providing a support for the rear rub-plate and to reduce the size and weight of that end of the truck, and it furthermore has to be constructed substantially as shown to adapt it for operating with axle-boxes at different heights, which is made necessary by the use of wheels of different diameters. The reduction in the wheel-base also necessitates a change in the structure of the rigid frame.

It will be seen that the brace $d$ is bent upward, so that the pivotal center comprising the male center plate $d'$ and female center plate $e$ can be elevated above the upper part of the truck-frame, while the car-body is brought down very low, and to this end I have framed my car-body substantially as shown, so as to give room for the upward bend of the brace $d$. In furtherance of these objects the rigid frame is constructed as follows: The upper chord 1 of the truck has an elevated flat portion 2, Fig. 1, a downwardly-extending portion 3, and a depressed and flat portion 4. The upper spring-plates 5 and 6 are secured to the under side of the upper chord 1. Secured either directly to the upper chord of the truck or to the spring-plates 5 and 6 is an inverted arch-bar 7, having a centrally-depressed portion 8 and two oblique and upwardly-extending ends 9 and 10, the end 9 being secured to the elevated portion 2 of the upper chord of the truck and the end 10 being secured to the depressed portion 4. Secured to the inverted arch-bar 7 is another arch-bar 11, having downwardly-extending legs 12 and 13. The arch-bar 11, together with the trusses 14 and 15 and supports 16 and 17, forms the lower chord of the rigid truck-frame Y, the ends of the trusses 14 and 15 being secured to the upper chord 1 of the truck-frame. This truck also carries what I term an "independent truck-frame," and by "independent" I mean a frame so mounted upon the truck that it will not be affected by any of the motions of the car-body, being permitted thereby to constantly retain a fixed relation to the two wheels.

The independent frame is here constructed of the side beams H, which are mounted upon the axle-boxes M by means of the saddles 18. The side beams are laterally joined together by the channel-beam L, and life-guards or fenders H' are affixed to their ends. This independent truck-frame is also specially constructed with a view of adapting it to be supported on the axles of the large and small wheels and for spring-supporting the free end of the motor X, so that the horizontal axis of the motor will be normally preserved parallel to the plane of the track without having to build up that portion of the frame which supports the springs. In accordance with this the side beams are shaped as follows: Where they are secured to the saddles 18, it (but one is shown) is horizontally disposed, as shown at 19 20. From there extends two downwardly-projecting legs 21 22, ending in the horizontally-disposed portion 23. From the front and rear saddles 18 it extends downwardly, as at 24 25, ending in the horizontally-disposed portions 26 27, to which the fenders H' are secured.

At K K, Fig. 1, are springs, which are duplicated on the other side of the truck, and these springs are interposed between the rigid truck-frame Y and axle-boxes M, so as to provide spring action between these parts, the independent frame H, however, not being affected by the action of these springs. The weight of the car-body being taken upon the upper chord of the rigid truck-frame instead of on the bolster, such weight is transferred from the truck-frame to the springs K K and from thence to the axle-boxes and wheels. Thus the weight of the car is taken upon a frame which is spring-supported from the axle-boxes in contradistinction to taking the weight of the car on a bolster which is spring-supported from the truck-frame. The electric motor X is only represented in a diagrammatic manner in the drawings, and is shown as supported at one end on the driving-axle $B^2$, its further end, which terminates in a lug $x'$, being spring-supported by means of an upright stud $l$, said stud being supported by the transverse channel-beam L, secured to the independent frame H. The stud $l$ is provided with spring caps and bolts $l'$ $l^2$, between which and the lug X' are placed spiral springs $m$ $m$. The frame H also carries wheel-brake shoes $n$ $n$, supported by the uprights N N', which uprights are secured to the independent frame H, the brake-shoes being suspended by links $n'$ from the uprights.

I do not limit myself to this specific means shown for supporting the brake-shoes on the frame H.

It is a very important feature of my invention to carry the weight of the car entirely or almost entirely between the rub-plates $f$ and $f'$, located as shown and described, while the truck is pivotally connected with the car-body, for this brings the weight where it is required, and at the same time makes an efficient and satisfactory bearing and leaves the center plates $d'$ and $e$ no other function than that of serving as a pivot about which the truck may radiate, or, to state it in the reverse way, about which the car-body can radiate in relation to the truck.

I do not here intend to limit myself to mechanically forming a pivotal center as a point about which the truck may radiate, as devices may be used which will permit a truck to radiate, while the pivotal center is merely a point.

Other changes and modifications may be made in the details of this structure without departing from the spirit of my invention.

Wherever the word "bolster" is used in the claims, I intend it to mean the means for supporting the male and female center plates.

Having thus described my invention, what I claim, and desire to secure by Letters Patent, is—

1. In a swiveling car-truck, the combination of a truck-frame comprising an upper continuous chord, a lower chord having supports for springs united to the upper chord, one end of the frame being enlarged and the other contracted, and a pair of driving-wheels and running-gear in the enlarged end and truck-wheels smaller than the driving-wheels in the contracted end, with the pivotal center located substantially over the driving-wheel axle, substantially as described.

2. In a swiveling car-truck, the combination of a truck-frame comprising an upper continuous chord, a lower chord having supports for springs united to the upper chord, one end of the frame being enlarged and the other contracted, and a pair of driving-wheels and running-gear in the enlarged end and truck-wheels smaller than the driving-wheels in the contracted end, with the pivotal center between the actual center of the truck and driving-wheel axle, substantially as described.

3. The combination of a car-body mounted upon a truck, said truck having a frame, large forward and smaller rear wheels, axles and axle-boxes for the same, side beams carried by the axle-boxes, and a motor sleeved on the axle at one end, its free end being spring-supported from the said side beams, substantially as described.

4. In a pivotal car-truck, the combination of a car-body mounted upon a truck, said truck having a frame, forward and rear axle-boxes, axles and wheels, a pivotal center located between the actual center of the truck and the center of one of the axles, and a motor sleeved upon one of the axles, and springs for supporting the free end of the motor, mounted upon the truck-frame, substantially as described.

5. In a pivotal car-truck, the combination of a car-body mounted upon a truck, said truck having a frame, forward and rear axle-boxes, axles and wheels, a pivotal center located between the actual center of the truck and the center of one of the axles, side beams hung from the axle-boxes, and a motor sleeved upon one of the axles, and springs for supporting the free end of the motor, mounted upon the side beams, substantially as described.

6. In a pivotal car-truck, the combination of a car-body mounted upon a truck, said truck having a frame, forward and rear axle-boxes, a pair of truck-wheels at one end and a pair of driving-wheels larger in diameter than the truck-wheels at the other end of the frame, a pivoted center located between the actual center of the truck and the center of the driving-axle, and a motor sleeved upon one of the axles, and springs for supporting the free end of the motor, mounted upon the truck-frame, substantially as described.

7. In a pivotal car-truck, the combination of a car-body mounted upon a truck, said truck having a frame, forward and rear axle-boxes, axles and wheels, a pivotal center directly over the center of one of the axles, a motor sleeved to the axle over which the pivotal center is located, and springs for supporting the free end of the motor, mounted upon the truck-frame, substantially as described.

8. In a pivotal car-truck, the combination of a car-body mounted upon a truck, said truck having a frame, forward and rear axle-boxes, a pair of truck-wheels at one end and a pair of driving-wheels larger in diameter than the truck-wheels at the other end of the frame, a pivotal center located between the actual center of the truck and the center of the driving-axle, side beams hung from the axle-boxes, and a motor sleeved upon the axle of the driving-wheel, and springs for supporting the free end of the motor, mounted upon the side beams, substantially as described.

9. In a pivotal car-truck, the combination of a car-body mounted upon a truck, said truck having a frame, forward and rear axle-boxes, a pair of truck-wheels at one end and a pair of driving-wheels larger in diameter than the truck-wheels at the other end of the frame, a pivotal center located directly over the driving-axle, and a motor sleeved to the driving-axle, and springs for supporting the free end of the motor, mounted upon the truck-frame, substantially as described.

10. In a pivotal car-truck, the combination of a car-body mounted upon a truck, said truck having a frame, forward and rear axle-boxes, a pair of truck-wheels at one end and a pair of driving-wheels at the other end of the frame, a pivotal center located directly over the driving-axle, side beams hung from the axle-boxes, and a motor sleeved upon the axle of the driving-wheel, and springs for supporting the free end of the motor, mounted upon the side beams, substantially as described.

11. In an electrically-propelled car-truck, the combination of a rigid truck-frame having forward and rear axle-boxes, a pair of truck-wheels at one end of the frame, a pair of driving-wheels larger in diameter than the truck-wheels mounted in axle-boxes at the opposite end of the frame, side beams supported from the axle-boxes, and a motor sleeved at one end upon the driving-axle, and the free end spring-supported upon the side beams, substantially as described.

12. In an electrically-propelled car-truck, the combination of a rigid truck-frame having forward and rear axle-boxes, a pair of truck-wheels at one end of the frame, a pair of driving-wheels larger in diameter than the truck-wheels mounted in axle-boxes at the opposite end of the frame, side beams hung from the axle-boxes, and a motor sleeved at one end upon the driving-axle, a beam transversely connecting the side beams, an upwardly-disposed stud secured to said beam, and springs secured upon the said stud, the free end of the motor engaging with said springs, substantially as described.

13. In an electrically-propelled car-truck, the combination, with a car-body, of a rigid truck-frame having forward and rear axle-boxes, side and rear rub-plates secured to the upper chord of the rigid truck-frame, corresponding rub-plates on the car-body, a pair of truck-wheels at one end of the truck-frame and a pair of driving-wheels mounted in axle-boxes at the opposite end of the frame, side beams supported on the axle-boxes, and a motor sleeved at one end upon the driving-axle, and the free end spring-supported from the side beams, substantially as described.

14. In an electrically-propelled car-truck, the combination, with a car-body, of a rigid truck-frame having forward and rear axle-boxes, side and rear rub-plates secured to the upper chord of the rigid truck-frame, corresponding rub-plates on the car-body, a pair of truck-wheels at one end of the truck-frame and a pair of driving-wheels mounted in axle-boxes at the opposite end of the frame, the pivotal center of the car-body and truck being directly over the driving-axle, side beams supported on the axle-boxes, and a motor sleeved at one end upon the driving-axle, and the free end spring-supported on the side beams, substantially as described.

15. In a pivotal car-truck, a frame having forward and rear wheels and running-gear for the same, and a truck center plate and bolster, both being located above and entirely without the body of the truck-frame, whereby a shorter wheel-base of the truck may be had, substantially as described.

16. In a pivotal car-truck, a frame having forward and rear wheels, running-gear for the same, a transversely-disposed beam or arch-bar secured to the upper chord of the said frame, a longitudinally-disposed truss secured to the upper chord of the frame at one end and to the said transverse beam at the other, and a center plate supported upon the horizontal truss, substantially as described.

17. In a pivotal car-truck, a frame having a continuous upper chord, forward and rear wheels and running-gear for the same, a center plate located above the said upper chord, and side and rear rub-plates on the upper chord, substantially as described.

18. In a pivotal car-truck, a truck-frame having a continuous upper chord, forward and rear wheels and running-gear for the same, rub-plates carried on the upper chord of said truck-frame and a rear rub-plate on the rear portion of the upper chord of the said frame, substantially as described.

19. In a pivotal car-truck, a frame having a continuous upper chord, forward and rear wheels, running-gear for the same, a center plate located above the said upper chord, side and rear rub-plates on the upper chord, the axis of the center plate and side rub-plates being in the center plate, said axis aligning with the axis of one of the axles of the truck, substantially as described.

20. In a truck, a frame with an upper continuous chord 1, having the raised section 2, downwardly-extending section 3, and depressed section 4, large driving-wheels and running-gear supported from the section 2, and small truck-wheels and running-gear supported from the section 4, substantially as described.

21. A rigid frame for a truck, comprising an enlarged section at one end and a contracted section at the other, having side rub-plates located on the enlarged section and an end rub-plate on the contracted section, substantially as described.

22. In a truck, the combination of a truck-frame having axles and axle-boxes at varying heights, and side beams adapted to be supported on the axle-boxes of such frame, substantially as described.

23. In a pivotal truck, the rigid frame comprising an enlarged section at one end and a contracted section at the other, combined with driving-wheels and running-gear located in the enlarged section and truck-wheels and running-gear in the contracted section, and side rub-plates set on the enlarged section and an end rub-plate on the contracted section, substantially as described.

24. In a pivotal truck, the rigid frame comprising an enlarged section at one end and a contracted section at the other, combined with driving-wheels and running-gear located in the enlarged section, truck-wheels and running-gear in the contracted section, and side rub-plates set on the enlarged section with their mutual axis substantially aligning with the axis of the driving-wheel axle, substantially as described.

25. In a pivotal truck, the rigid frame comprising an enlarged section at one end and a contracted section at the other, combined with driving-wheels and running-gear located in the enlarged section, truck-wheels and running-gear in the contracted section, and an end rub-plate on the contracted section, located substantially over the axle of the truck-wheels, as set forth.

26. In a truck, the combination of a truck-frame having axle-boxes at varying heights, side beams adapted to be supported on the axle-boxes, and wheel brake-shoes mounted on the side beams, substantially as described.

27. In a truck, the combination of a truck-frame having axle-boxes at varying heights, axles set in said axle-boxes, side beams adapted to be supported on the axle-boxes, and a motor sleeved on one of the axles at one end and its free end spring-supported from the side beams, substantially as described.

28. In a truck-frame, the combination of a truck-frame having axle-boxes at varying heights, axles set in said axle-boxes, side beams adapted to be supported on the axle-boxes, a motor sleeved on one of the axles at one end and its free end spring-supported from the side beams, and wheel brake-shoes mounted on the side beams, substantially as described.

29. The combination of a truck having a frame, axle-boxes in its forward and rear ends, driving-wheels and truck-wheels smaller in diameter than the driving-wheels and axles set in the axle-boxes at opposite ends of the frame, and side beams supported on the axle-boxes, said side beams having an elevated section where they are supported upon the driving-wheel axle-boxes and a depressed section where they are supported upon the truck-wheel axle-boxes, substantially as described.

30. The combination of a truck having large and small wheels, and side beams having an elevated section where they are supported upon the axle-boxes of the large wheels and a depressed portion where they are supported upon the axle-boxes of the truck-wheels, substantially as described.

31. In a pivotal truck, a frame with an upper continuous chord 1, having the raised section 2, downwardly-extending section 3, and depressed section 4, and a center plate located upon the said chord in the raised section 2, substantially as described.

32. In a pivotal truck, a frame with an upper continuous chord 1, having the raised section 2, downwardly-extending section 3, and depressed section 4, a center plate on the said chord in the section 2, large driving-wheels and running-gear in section 2, and smaller truck-wheels and running-gear in section 4, substantially as described.

33. In a pivotal truck, the combination of the rigid frame having a contracted section at one end and an enlarged section at the other, a center plate and side rub-plates located upon the upper chord in the enlarged section of said frame, driving-wheels and running-gear in the enlarged section and truck-wheels and running-gear in the contracted section of said frame, the mutual axis of the side rub-plates and center plate being substantially over the axis of the driving-wheel, substantially as described.

34. In a pivotal truck, the combination of the rigid frame having a contracted section at one end and an enlarged section at the other, a center plate and side rub-plates located upon the upper chord in the enlarged section of said frame, a rear or end rub-plate located upon the upper chord in the contracted section of said frame, driving-wheels and running-gear in the enlarged section and truck-wheels and running-gear in the contracted section of said frame, the mutual axis of the side rub-plates and center plate being substantially over the axis of the driving-wheel, substantially as described.

35. The combination, with a truck-frame having an enlarged section at one end and a contracted section at the other, of driving-wheels and running-gear in the enlarged section, truck-wheels and running-gear in the contracted section, side beams supported upon the running-gear, and wheel brake-shoes mounted upon the side beams, substantially as described.

36. The combination of a car-body and a pivotal truck having large driving-wheels and running-gear, the car-body having recesses below the car-flooring proper within which the driving-wheels may radiate, with a body-bolster and truck-bolster extending up into the car-body but below the flooring thereof, substantially as described.

37. The combination of a car-body and a pivotal truck having large driving-wheels and running-gear, the car-body being provided with a recess below the flooring proper of the car within which the driving-wheels can radiate, with a bolster on the car-body extending up within the car-body but below the flooring proper thereof, substantially as described.

38. In a pivotal car-truck, the combination of a truck-frame having an upper chord, a beam or arch-bar secured transversely to the said upper chord, a horizontal truss secured to the said transverse beams and upper chord of truck-frame, a female center plate secured to said horizontal truss, with an X shaped brace supported by the car-body, upwardly inclined, and having a male center plate secured to it, substantially as described.

39. A car-truck having a rigid frame, said frame comprising a continuous upper chord, a lower chord having supports for springs, and a central brace uniting the upper and lower chords, one end of the frame being enlarged and the other contracted, substantially as described.

40. A car-truck having a rigid frame, said frame comprising the continuous upper chord 1, having the raised and flat section 2, downward-extending section 3, and depressed and flat section 4, a lower chord united at its ends with the upper chord, and a centrally-disposed brace uniting the upper and lower chords, substantially as described.

41. A car-body having longitudinal sills and transverse girders, the outside longitudinal sills having side rub-plates, a rub-plate transversely secured to the longitudinals to the rear of the side rub-plates, and means for carrying the center plate, secured to the transverse girders, between the centrally-located longitudinals, substantially as described.

42. A car-body having the longitudinal sills A A' A'' A''' and transverse girders $a$ $a'$, the sills A A''' having side rub-plates $f$, a rub-plate $f'''$, secured to one or all of the said sills, and the body-bolster $d$, having an upwardly-inclined portion ending in the plate $d^2$, having center plate $d'$, secured to the girders $a$ $a'$, substantially as described.

43. In a pivotal truck, the combination of the car body and truck, the said truck having a rigid frame, forward and rear axle-boxes and wheels, side and rear rub-plates secured to said rigid frame, corresponding rub-plates on the car-body, and side beams supported upon the axle-boxes, the pivotal center of the car body and truck being located substantially over the axis of one of the axles, substantially as described.

44. In a pivotal truck, the combination of the car body and truck, the said truck having a rigid frame, forward and rear axle-boxes and wheels, side and rear rub-plates secured to said rigid frame, corresponding rub-plates on the car-body, and a motor supported upon the truck-frame, the pivotal center of the car body and truck being located substantially over the axis of one of the wheels, substantially as described.

45. In a pivotal car-truck, the combination of the car body and truck, the said truck having a rigid frame, forward and rear axle-boxes and wheels, side and rear rub-plates secured to said rigid frame, corresponding rub-plates on the car-body, side beams supported upon the axle-boxes, and a motor sleeved at one end upon one of the axles and its free end spring-supported from the side beams, the pivotal center of the car body and trucks being located substantially over the axis of the axle upon which the motor is sleeved, substantially as described.

46. In a pivotal car-truck, the combination of the car body and truck, the said truck having a rigid frame, forward and rear axle-boxes and wheels, side and rear rub-plates secured to said rigid frame, corresponding rub-plates on the car-body, side beams supported upon the axle-boxes, a transverse beam connecting the side beams, having an upwardly-extending stud, spring and spring-caps on said stud, and a motor sleeved at one end upon one of the axles and its free end engaging the springs on said stud, the pivotal center of the car body and truck being located substantially over the axis of the axle upon which the motor is sleeved, substantially as described.

47. In a pivotal car-truck, the combination of the car body and truck, the truck having a rigid frame comprising an enlarged section at one end and a contracted section at the other, said frame having forward and rear axle-boxes and wheels, side and rear rub-plates secured to said frame, and corresponding rub-plates on the car-body, the pivotal center of the car body and truck being located substantially over the axis of one of the axles, substantially as described.

48. In a pivotal truck, the combination of the car body and truck, the said truck having a rigid frame, forward and rear axle boxes and wheels, side and rear rub-plates secured to said frame, corresponding rub-plates on the car-body, and side beams secured to the axle-boxes, the pivotal center of the car-body and truck being located substantially over the axis of one of the axles, substantially as described.

49. In a pivotal truck, the combination of the car-body and truck, the said truck having a rigid frame, side and rear rub-plates secured to said frame, corresponding rub-plates on the car-body, side beams secured to the axle-boxes, and wheel brake-shoes mounted upon the side beams, the pivotal center of the car body and truck being located substantially over the axis of one of the axles, substantially as described.

50. In a pivotal car-truck, the combination of the car body and truck, the car-body having a body-bolster and center plate secured within its longitudinal sills, the truck having a rigid frame, forward driving-wheels and rear truck-wheels with running-gear for the same, side and rear rub-plates, and a center plate secured to the upper chord of said frame, and corresponding rub-plates on the car-body, the pivotal center of the car body and truck being substantially over the axis of the driving wheel axle, substantially as described.

51. In a pivotal car-truck, the combination of the car body and truck, the car-body having a body-bolster and center plate secured within its longitudinal sills, the truck having a rigid frame comprising a contracted section at one end and an enlarged section at the other, driving-wheels and running-gear in the enlarged section, truck-wheels and running-gear in the contracted section, side rub-plates secured on the enlarged and a rear rub-plate on the contracted section of said frame, corresponding rub-plates on the car-body, and a center-plate secured to and above the upper chord in the enlarged section of said frame, substantially as described.

52. In a truck-frame, the combination of a truck-frame having axle-boxes at varying heights, axles set in said axle-boxes, side beams adapted to be supported on the axle-boxes of such a frame, and fenders or life-guards carried by the side beams, substantially as described.

53. In a pivotal truck, the rigid frame comprising an enlarged section at one end and a contracted section at the other end, a beam having an upwardly-rising section transversely secured to the upper chord of said frame, and a brace secured to the said transversely-disposed beam at one end and to the said upper chord at the upper end, and a center plate located upon said brace, all which are located upon and above the upper chord in the enlarged section of said frame, substantially as described.

54. A car-body having longitudinal sills, an X-shaped brace secured between two of said longitudinal sills, said brace having an upwardly-rising section terminating in substantially a flat plate, and a center plate secured to said flat plate, substantially as described.

55. The combination, in an electrically-propelled car, of a truck pivotally secured to said car-body, said truck having wheels, axles, and axle-boxes, side beams secured to the axle-boxes, a motor sleeved at one end upon one of the axles, its free end being supported by the side beams, and a rub-plate located upon the end of the truck opposite to that end upon which the motor is located, substantially as described.

56. The combination, in an electrically-propelled car-truck, of a truck-frame having driving-wheels, axle, and axle-boxes at one end, truck-wheels, axle, and axle-boxes at the other, the said truck-wheels being smaller in diameter than the said driving-wheel, a motor sleeved upon the axle of the driving-wheel, its free end being supported upon said truck-frame, and a rub-plate located upon the end of the truck-frame opposite to that end upon which the motor is located, substantially as described.

57. In an electrically-propelled car-truck, the combination of a frame having an enlarged section at one end and a contracted section at the other, large driving-wheels, axle, and axles-boxes located in enlarged section, smaller truck-wheels, axle, and axle-boxes located in the contracted section, a motor sleeved upon the axle of said driving-wheels, its free end being supported upon the truck-frame, and a rub-plate located upon the end of the truck-frame opposite to that upon which the motor is located, substantially as described.

58. In an electrically-propelled car-truck, the combination of a truck-frame having driving-wheels, axle, and axle-boxes at one end, truck-wheels smaller in diameter than the driving-wheels, located at the other end, and running-gear for the same, side beams supported upon the axle-boxes, a motor sleeved upon the axle of the driving-wheels, its free end being spring-supported upon side beams, and a rub-plate located upon the end of the truck opposite to that upon which the motor is located, substantially as described.

59. In an electrically-propelled car-truck, the combination of a truck-frame having an enlarged section at one end, a contracted section at the other end, driving-wheels, axle-boxes, and an axle located in the enlarged section, truck-wheels smaller than the driving-wheels, an axle and axle-boxes located in the contracted section, side beams mounted upon the axle-boxes, a motor sleeved upon the axle of the driving-wheels, its free end being spring-supported from the side beams, and a rub-plate located on the end of a truck opposite to that end upon which the motor is located, substantially as described.

60. The combination, in an electrically-propelled car, of a truck pivotally secured to the car-body, said truck having wheels and running-gear at each end thereof, and side beams hung from the running-gear, of a motor sleeved upon one of the axles, its free end being spring-supported from the side beams, and a rub-plate on the frame and opposite the end upon which the motor is located, substantially as described.

61. A truck having a frame, said frame comprising the continuous upper chord 1, having a raised and flat section 2, downwardly-extending section 3, depressed and flat section 4, a lower chord united at its ends with the upper chord, and a centrally-disposed brace uniting the upper and lower chords, combined with large driving-wheels and running-gear in section 2 and smaller truck-wheels in section 4, substantially as described.

Signed at the city, county, and State of New York this 29th day of September, 1890.

JOHN A. BRILL.

Witnesses:
B. T. VETTERLEIN,
HERBERT F. DURBUR.